US010537834B2

(12) United States Patent
Wnuk et al.

(10) Patent No.: US 10,537,834 B2
(45) Date of Patent: Jan. 21, 2020

(54) FILTER APPARATUS

(71) Applicant: HYDAC PROCESS TECHNOLOGY GMBH, Neunkirchen (DE)

(72) Inventors: Ralf Wnuk, Bexbach/Kleinottweiler (DE); Markus Olschok, Neunkirchen (DE); Christian Schindler, Sulzbach (DE)

(73) Assignee: HYDAC PROCESS TECHNOLOGY, Neunkirchen (DE)

( * ) Notice: Subject to any disclaimer, the term of this patent is extended or adjusted under 35 U.S.C. 154(b) by 0 days.

(21) Appl. No.: 15/777,706

(22) PCT Filed: Oct. 28, 2016

(86) PCT No.: PCT/EP2016/001805
§ 371 (c)(1),
(2) Date: May 21, 2018

(87) PCT Pub. No.: WO2017/088949
PCT Pub. Date: Jun. 1, 2017

(65) Prior Publication Data
US 2018/0257010 A1    Sep. 13, 2018

(30) Foreign Application Priority Data

Nov. 25, 2015   (DE) .................. 10 2015 015 237

(51) Int. Cl.
*B01D 29/66*        (2006.01)
*B01D 29/23*        (2006.01)
(Continued)

(52) U.S. Cl.
CPC ........... *B01D 29/668* (2013.01); *B01D 29/23* (2013.01); *B01D 29/52* (2013.01); *B01D 29/665* (2013.01); *B01D 35/16* (2013.01)

(58) Field of Classification Search
CPC .... B01D 29/668; B01D 35/16; B01D 29/665; B01D 29/23; B01D 35/1576; B01D 29/52; B01D 2201/0438
(Continued)

(56) References Cited

U.S. PATENT DOCUMENTS 3,380,591 A    4/1968  Muller
3,703,465 A    11/1972 Reece et al.
(Continued)

FOREIGN PATENT DOCUMENTS

DE          1 486 812        3/1970
DE     10 2011 100 518     11/2012
(Continued)

OTHER PUBLICATIONS

International Search Report (ISR) issued Jan. 26, 2017 in International (PCT) Application No. PCT/EP2016/001805.

*Primary Examiner* — Madeline Gonzalez
(74) *Attorney, Agent, or Firm* — Wenderoth, Lind & Ponack, L.L.P.

(57) ABSTRACT

A filter apparatus has a plurality of filter elements (21) accommodated in a filter housing (1) with a filter inlet (11) and a filter outlet (13). During the operation one of the filter elements (21) can be backflushed by a backflushing device. The backflushing device includes a pressure control (7) to support the backflushing. Each filter elements (21) is accommodated in an element housing (30). The element housings (30) with the filter elements (21) performing the filtration process are connected to the fluid outlet (13) by their one open ends (33) in a fluid conducting manner. The element housing (30) of the filter element (21) being backflushed is exclusively connected with its open end (33) to the pressure control device (7).

21 Claims, 2 Drawing Sheets

(51) Int. Cl.
*B01D 29/52* (2006.01)
*B01D 35/16* (2006.01)

(58) Field of Classification Search
USPC ... 210/435, 106–108, 275, 333.01, 393, 411, 210/425, 427
See application file for complete search history.

(56) References Cited

U.S. PATENT DOCUMENTS

| | | |
|---|---|---|
| 2013/0292321 A1 | 11/2013 | Wnuk et al. |
| 2014/0091021 A1 | 4/2014 | Wnuk et al. |
| 2014/0202938 A1 | 7/2014 | Wnuk et al. |
| 2014/0284257 A1* | 9/2014 | Park .................. B01D 29/23 210/105 |

FOREIGN PATENT DOCUMENTS

| | | |
|---|---|---|
| DE | 11 2012 004 992 | 9/2014 |
| WO | 2012/079661 | 6/2012 |

* cited by examiner

FILTER APPARATUS

FIELD OF THE INVENTION

The invention relates to a filter device having a plurality of filter elements accommodated in a filter housing with a filter inlet for fluid to be filtered and a filter outlet for the filtered fluid. During the operation of the device, at least one of the filter elements can be backflushed by a backflushing device for cleaning its effective filter surface. The backflushing device contains a pressure control device to support the backwashing.

BACKGROUND OF THE INVENTION

Filter devices of this kind are state of the art and are used in a number of different applications and for the filtration of different flow-capable media. Different device designs are conceivable depending on the field of application. Preferred application fields are the cleaning of fluids, such as hydraulic fluids, lubricants or fuels. Such devices can also be used for water treatment or in conjunction with process fluids or working fluids of other kinds. To ensure an uninterrupted operation of the connected system to be supplied with the filtrate, regeneration of the filter elements is essential for realizing the filtration in a consecutive manner by backflushing. During respective backwashing phases, a partial flow of the filtrate flows through the filter element to be regenerated in the opposite direction to remove the dirt from the element and carry it away. To be able to remove stubborn contaminants in the backwashing operation, backwashing operation is known not only to employ the operating pressure or system pressure, but to support the backflushing operation with a pressure control device.

As related prior art, WO 2012/079661 A1 discloses a filter device of the type described above. The pressure control device has a hydropneumatic piston accumulator. The accumulator piston forms the mobile separating element between a gas side and a fluid side, which fluid side is connected to the filtrate side in the filter housing of the filter device. The filter elements are arranged rotatable in the filter housing in such a way that a filter element to be regenerated can be aligned by its raw or clean side with a backflushing outlet, on which a backflushing valve is located. In order to trigger the backflushing operation for this filter element, the backflushing valve is opened, so that for the backflushing operation the volume of the fluid side with the accumulator pressure of the piston accumulator as pressure gradient is available for removing the contaminants.

SUMMARY OF THE INVENTION

Given this prior art, the invention addresses the problem of providing a filter device distinguished by particularly advantageous operational behavior.

According to the invention, this problem is basically solved by a filter device having, as a significant feature of the invention, filter elements respectively accommodated in element housings. The element housings with the filter elements performing the filtration operation each have one open end connected in a fluid-conducting manner to the filter outlet. The element housing of the respective filter element being backflushed has its one open end connected only to the pressure control device. With this encapsulation of the filter elements formed by the element housings, the pressure of the pressure control device supporting the backflushing operation acts only on the element to be regenerated and located in the backflushing position. The filter elements performing the filtration operation then remain entirely unaffected by the backflushing pressure of the pressure control device, so that these filter elements perform in a normal manner, with the filtration operation also during backflushing phases under the influence of the system pressure. The backflushing operation is able to be performed with a relatively higher backflushing pressure permitting a particularly effective dirt removal.

In advantageous exemplary embodiments, the respective element housings are formed from hollow cylinders with closed lateral surfaces, with the other free ends of the element housings having an opening delimited by the respective accommodated filter element. In this regard, each filter element adjoins the opening in such a way the respective opening forms a fluid connection to the inner cavity of the filter element surrounded by the filter medium.

The respective filter element can particularly advantageously be formed conical and have its smallest diameter in the direction of the pressure control device. Such filter elements, also known as filter candles, are preferably known slotted sieve tube filter elements.

The arrangement can advantageously be such that the flow chamber between each element housing and the accommodated filter element expands conically in the direction of the pressure control device, with the free cross section of the flow chamber at the top end of the respective filter element amounting to 50 to 120%, preferably 100%, of the inlet surface of the element cap of the filter element. This design results in a particularly advantageous flow of the fluid current, so that even stubborn contaminants can be removed in the backflushing operation.

In preferred exemplary embodiments, all filter elements with their element housings are mounted at the end side in rotary receptacles that can be moved from a filtration position into a backflushing position and back to a filtration position by a rotary drive, preferably in a consecutive manner. For the individual filter elements a rapid and reliable change of operation type between filtration and backflushing can then be obtained.

The filter elements performing the filtration operation can advantageously be flowed through from the inside to the outside and attached at their bases to a common-to-all unfiltrate chamber in the filter housing, into which the filter inlet opens. In the case of a closed head end of the respective filter element, the flow chamber located on the outside thereof opens, via the top open end of the element housing, into a common filtrate chamber, which is connected to the filter outlet.

In this arrangement the respective filter element undergoing the backflushing operation is flowed through from the outside to the inside, is connected with its element housing at the head to the pressure control device and is connected in a fluid-conducting manner at the base to a dirt discharge valve via the free element end.

Particularly advantageously, the rotary receptacles that can be pivoted of the rotary drive with the filter elements with their element housings can be accommodated concentric and with a definable spacing in the filtrate chamber of the filter housing. With that arrangement of the filter elements in the manner of an element turret, a particularly compact filter device can realize high filter performance.

The pressure control device can particularly advantageously have an accumulator part with a pressure chamber that can be filled with a working gas and a fluid chamber accommodating a backflush volume. This arrangement provides a relatively small constructive expense and a fluid volume sufficiently large for an optimal backflushing operation with the desired pressure level.

In particularly advantageous exemplary embodiments, the accumulator part is formed as a piston accumulator. A mobile accumulator piston is arranged for a media separation between the working gas located in the pressure chamber and the backflush fluid.

The arrangement can advantageously be such that, between the pressure control device and the filtrate chamber with the rotary receptacles, a separating wall in the filter housing has a throttle point in a fluid-conducting manner connecting the one bottom piston chamber of the piston accumulator formed with the accumulator piston to the filtrate chamber. The fluid side of the piston accumulator can then be automatically filled with a filtrate volume during the phases of normal filtration operation via the throttle point. The filtrate volume is then available for a subsequent backflushing operation, with the accumulator piston being driven by introduction of a pressure medium, such as compressed air, into the gas side to drive out the collected fluid volume from the fluid side of the accumulator.

Other objects, advantages and salient features of the present invention will become apparent from the following detailed description, which, taken in conjunction with the drawings, discloses a preferred embodiment of the present invention.

BRIEF DESCRIPTION OF THE DRAWINGS

Referring to the drawings that form a part of this disclosure.

DETAILED DESCRIPTION OF THE INVENTION

Figure 1:
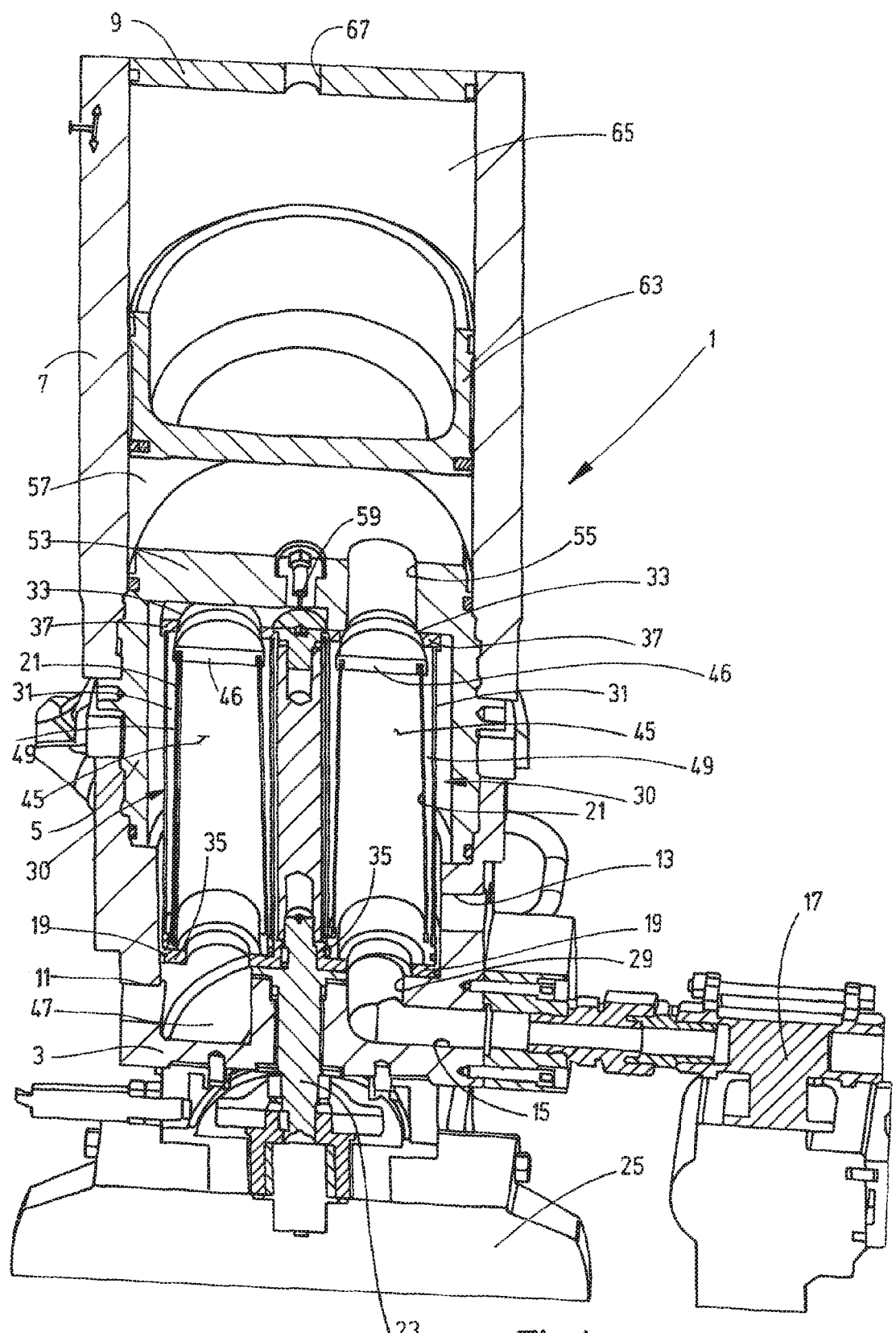
FIG. 1 is a perspective view in section of a filter device according to an exemplary embodiment of the invention.

In the drawing figures, the housing 1 of the exemplary embodiment of the filter device according to the invention is formed in three parts and includes a base part 3, a central part 5 and a top accumulator part 7 in a fluid-tight manner and screwed to each other. The top accumulator part 7 is closed in a fluid-tight manner at the top end by a housing cover 9 shown only in FIG. 1. The parts 3, 5 and 7 each comprise a circular cylindrical section of the housing interior. The base part 3 has, in the vicinity of its closed bottom end, a filter inlet 11 for fluid to be filtered. Opposite the filter inlet 11 and offset upwards relative thereto, a filter outlet 13 is in base part 3 for the filtered fluid. Diametrically opposite the filter inlet 11 on the base part 3 is a dirt outlet 15, by which in a backflushing operation the respective backflushing fluid volume can be carried out of the device via a connected dirt release valve 17. The dirt release valve 17 is formed by a motorized valve of standard construction.

In a manner corresponding to the filter device disclosed in WO 2012/079661 A1, the interior of the base part 3 and of the central part 5 together is provided with a rotary drive having rotary receptacles 19 with filter elements 21 mounted thereon to form an element turret. The filter elements 21 formed from conical filter candles, in particular in the form of slotted sieve tube filter elements, are grouped along a circular arc inside the filter housing 1 about the vertical axis, as in the above-mentioned, known solution. For a gradual rotational movement of the filter elements 1 about the vertical axis, the rotary receptacles 19 are connected via a drive shaft 23 to a drive motor 25 (hydraulic or electric) that is only depicted in FIG. 1. Motor 25 generates rotary movements of the shaft 23 in a step by step manner in order to rotate the rotary receptacles 19 into rotary positions in a gradual manner. Rotary positions of the rotary receptacles 19 for the filter elements 21 performing the filtration are respectively aligned with an unfiltrate chamber 47 opening into the fluid inlet 11. The rotary receptacle 19 with the filter element 21 positioned for the backflushing is aligned with a dirt removal channel 29 in the base part 3, which removal channel leads to the dirt outlet 15.

Figure 2:
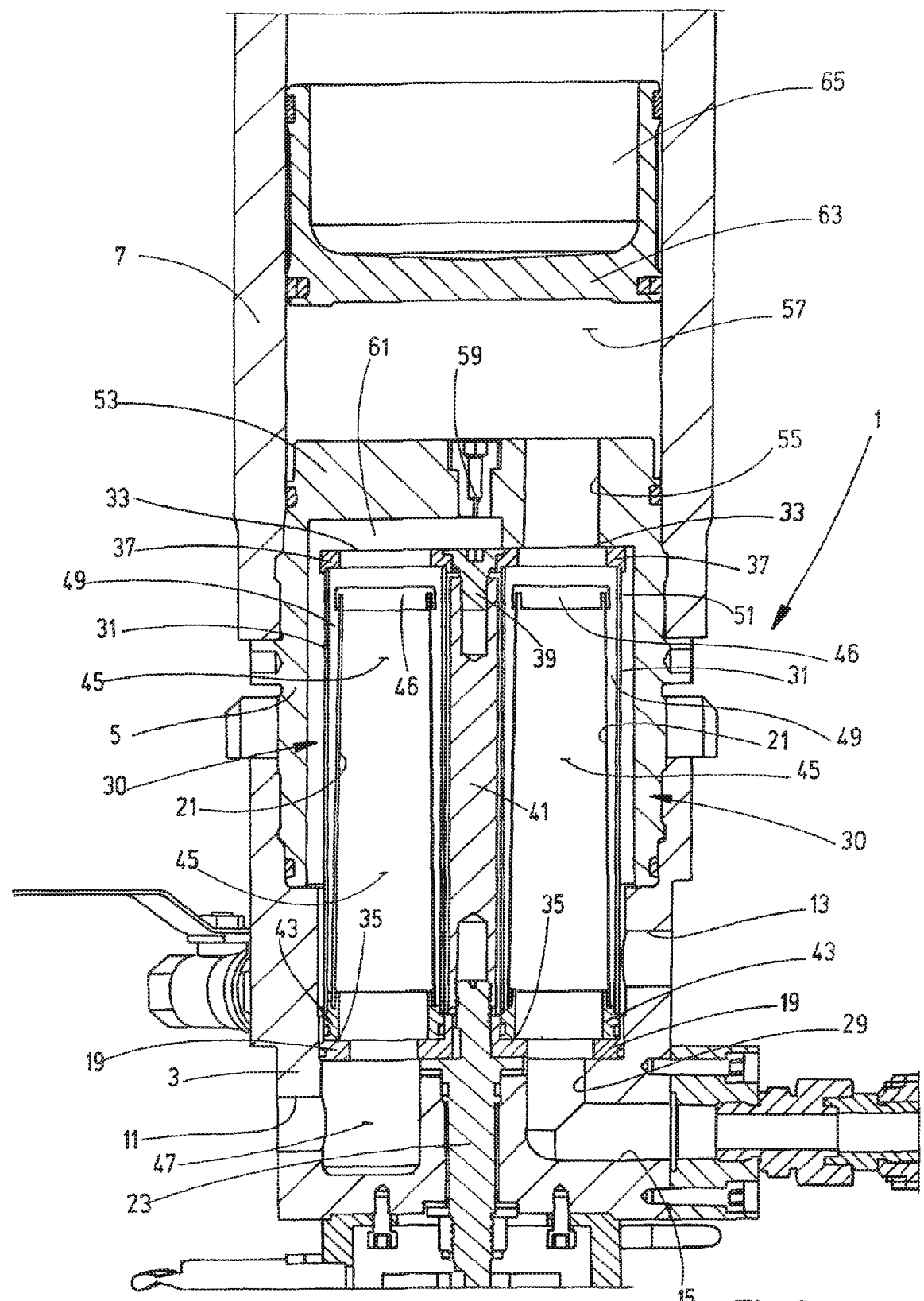
FIG. 2 is a side view in section of the exemplary embodiment, wherein the top housing cover, the dirt release valve and the motor of a rotary drive are omitted.

Each of the filter elements 21 is accommodated in an element housing 30, the main part of which is formed by a hollow cylinder 31 with a closed lateral surface. Each element housing 30 extends between a top open end 33 and a bottom open end 35 of the element housing 30. At the top open end 33 a respective annular body 37 is located on the end of each hollow cylinder 31. The annular bodies are connected via screws 39 to a support 41 forming a coaxial extension of the drive shaft 23. At the bottom open ends 35 of the element housings 30, filter element caps 43 (FIG. 2) are provided. Each filter cap is connected in a fluid-tight manner with the assigned rotary receptacle 19.

In this arrangement, the inner filter cavities 45 of the filter elements 21 performing the filtration are connected via their bottom open ends 35 to the unfiltrate chamber 47, into which the fluid inlet 11 opens. The filtration then takes place from the inner cavities 45, which are closed at their top ends by end bodies 46, towards the outsides through the filter elements 21. The flow chamber 49 between each element housing 30 and the outside of the accommodated filter element 21 therein forms the respective clean side, with each flow chamber 49 tapering conically upwards and being connected via the top open end of the element housings 30 formed by the annular bodies 37 to a common filtrate chamber 51, to which the fluid outlet 13 is in turn connected.

The housing central part 5 has a separating wall 53 on its top end forming the transition to the accumulator part 7. This separating wall 53, at a point aligned with the respective filter element 21 provided for a backflushing operation, has is a passage 55. Via this passage 55, the pressure chamber 57 of the accumulator part 7 adjoining the separating wall 53 is connected, via the top open end 33 of the element housing 30 containing the filter element 21 to be backflushed, to the flow chamber 49 on the outside of this filter element 21. This pressure chamber 57 is additionally connected via a throttle point 59 located in the separating wall 53 to the top region 61 of the filtrate chamber 51. As mentioned and as depicted only in FIG. 1, the top end of the accumulator part 7 is closed by a cover part 9. With a freely movable accumulator piston 63 that is longitudinally displaceable in the accumulator part 7, the accumulator part 7 then forms a piston accumulator, in which the pressure chamber 57 located beneath the piston 63 forms the fluid side and the chamber 65 located between the piston 63 and the cover part 9 forms the gas side. The gas side can be filled via a connection 67 located in the cover part 9 with a working gas, such as compressed air. For this purpose, connected to the connection 67 is a pressure supply device (not depicted in detail in the drawings), which pressure supply device corresponds to the prior art, as is provided in the known filter device of WO 2012/079661 A1 and which comprises a valve device for supplying the chamber 65 with compressed air via a compressed air line or to block the compressed air supply, while the chamber 65 is connected to the environment via a filter/throttle device.

In this arrangement, the pressure chamber 57 forming the fluid side of the piston accumulator formed in the accumulator part 7 can be filled with filtrate via the throttle point 59, at which the system pressure of the filtrate chamber 51 is applied, with the accumulator piston 63 moving upwards with an aerated gas-side chamber 65. In order to initiate a backflushing operation when the respective filter element 21 is aligned with the backwashing position, as is the case of the filter element 21 visible on the right in the figures, the gas-side chamber 65 of the piston accumulator is charged with compressed air to a pressure level which corresponds to the desired backflushing pressure. With the now opened dirt release valve 17, the accumulator piston 63 drives the fluid volume collected in the chamber 57 as a backflushing volume through the passage 55 and the top open end 33 of the element housing 30 located in the backflushing position into the flow chamber 49 on the outside of the filter element 21, so that this filter element is flowed through under the backflushing pressure from the outside to the inner cavity 45.

In this backflushing operation, which occurs with backflushing pressure supplied from the piston accumulator, which backflushing pressure can be selected significantly higher than the system pressure, even stubborn contaminants are removed to be carried off via the bottom open end 35 of the corresponding element housing 30 and via the removal channel 29. If, after the backflushing is complete, the dirt removal valve 17 is closed and the gas-side chamber 65 above the accumulator piston 63 is again aerated towards the environment via a throttle, another filling of the fluid-side chamber 57 from the filtrate chamber 51 occurs via the throttle point 59 due to the system pressure, while the filter elements 21 not set to the backflushing position perform the filtration. Because these filter elements 21 are completely separated by their element housing 30 from the pressure chamber 57 of the piston accumulator conducting the backflushing pressure, the filtration in the case of the not backflushed filter elements 21 occurs in an entirely undisturbed manner and without any disturbance from the backflushing pressure acting on the backflushed filter element 21.

The support of the backflushing operation by the pressure control could also take place without the media separation formed by the accumulator piston 63 of the accumulator part 7 in such a way that the working gas of the accumulator part 7 acts on the fluid directly. For this purpose the accumulator piston 63 must be removed from the chamber 57 of the accumulator housing and directly connected to an external pressure source, such as a nitrogen source, which, controlled by a valve device which is not depicted in detail, delivers defined pressure volumes into the chamber 57.

While one embodiment has been chosen to illustrate the invention, it will be understood by those skilled in the art that various changes and modifications can be made therein without departing from the scope of the invention as defined in the claims.

The invention claimed is:

1. A filter device, comprising:
a filter housing having a filter inlet capable of receiving fluid to be filtered into said filter housing, a filter outlet capable of conveying filtered fluid from said filter housing and a central housing part;
a plurality of filter elements in said filter housing, each said filter element being in a respective element housing, each said element housing having a first opening;
rotary receptacles with a rotary drive in said filter housing, said filter elements and said element housings being mounted at ends thereof on said rotary receptacles in a common filtrate chamber of said filter housing and being movable by said rotary receptacles and said rotary drive between a filtering position capable of filtering fluid conveyed from said filter inlet to said filter outlet and a backflushing position in said filter housing, said first openings being connected in fluid communication with said filter outlet in the filtering position;
a backflusher having a pressure control in said filter housing capable of backflushing one of said filter elements in the backflushing position to clean an effective filter surface of the filter element in the backflushing position with said first opening of said element housing in said backflushing position being connected in fluid communication only to said pressure control, said pressure control having a pressure accumulator with a pressure chamber fillable with a pressurized working gas and a fluid chamber accommodating a volume of backflushing fluid;
a separating wall being at an end of said central housing part adjacent said pressure accumulator extending in said filter housing between said fluid chamber of said pressure accumulator and said common filtrate chamber in said filter housing surrounding one of said filter elements in the filtering position, said central housing part forming a transition to said pressure accumulator;
a passage extending though said separating wall being axially aligned with the filter element in the backflushing position.

2. A filter device according to claim 1 wherein said rotary receptacles and said rotary drive move said filter elements consecutively between the filtering position and the backflushing position.

3. A filter device according to claim 1 wherein said element housings comprise hollow cylinders with closed lateral surfaces and having second openings at axial ends opposite said first openings, said second openings being delimited by said filter elements.

4. A filter device according to claim 1 wherein said filter elements are conical with smaller ends thereof in a direction of said pressure control.

5. A filter device according to claim 1 wherein flow chambers between said element housings and said filter elements therein expand conically in a direction of said pressure control, free cross sections of said flow chambers at ends thereof adjacent said pressure control are 50 to 120% of inlet surfaces of element caps of said filter elements.

6. A filter device according to claim 5 wherein said free cross section of said flow chambers are 100% of the inlet surfaces of said element caps.

7. A filter device according to claim 1 wherein said filter element in the filtering position has fluid flowing therethrough from an inside thereof to an outside thereof and is connected at a base thereof to a common unfiltrate chamber in said filter housing, said common unfiltrate chamber opening into said filter inlet in fluid communication, said filter elements having closed head ends; and
a flow chamber between said element housing and said filter element in the filtering position opens at an end thereof proximate said pressure control in fluid communication with said common filtrate chamber in said filter housing, said common filtrate chamber being in fluid communication with said filter outlet.

8. A filter device according to claim 1 wherein
said filter element in the backflushing position has a fluid flow therethrough from an outside thereof to an inside thereof, is connected with the respective element housing thereof at a head side thereof to said pressure control in fluid communication and is connected at a base side thereof via a free element end of the respective element housing to a direct release valve in fluid communication.

9. A filter device according to claim 1 wherein
said rotary receptacles are pivoted by said rotary drive together with said filter elements and said element housings concentrically with defined spacings in said filtrate chamber of said filter housing.

10. A filter device according to claim 1 wherein
said pressure accumulator is a piston accumulator with an accumulator piston forming a mobile separating element between said pressure chamber and said fluid chamber.

11. A filter device according to claim 1 wherein
said separating wall has a throttle point connecting said fluid chamber of said pressure accumulator and said common filtrate chamber in fluid communication.

12. A filter device, comprising:
a filter housing having a filter inlet capable of receiving fluid to be filtered into said filter housing and a filter outlet capable of conveying filtered fluid from said filter housing;
filter elements accommodated in separate element housings in said filter housing said filter elements having closed head ends and open base ends at opposite axial end thereof and being movable in said filter housing between a filtering position capable of filtering fluid conveyed from said filter inlet to said filter outlet and a backflushing position, said element housings having first open ends in fluid communication with said fluid outlet in the filtering position;
a backflusher being capable of cleaning effective filter surfaces of said filter elements and having a pressure control supporting backflushing, said first open ends of said element housings only being connected in fluid communication with said pressure control in the backflushing position, said pressure control having a piston accumulator with a pressure chamber filled with a working gas and a fluid chamber accommodating a backflushing volume separated by a movable accumulator piston;
flow chambers located outside of said filter elements open via open ends of said element housings into a common filtrate chamber in fluid communication with said filter outlet in the filtering position;
a separating wall between said pressure control and said common filtrate chamber in said filter housing; and
a throttle point connecting said fluid chamber of said piston accumulator and said common filtrate chamber in fluid communication.

13. A filter device according to claim 12 wherein
a rotary receptacles and a rotary drive move said filter elements consecutively between the filtering position and the backflushing position.

14. A filter device according to claim 12 wherein
said element housings comprise hollow cylinders with closed lateral surfaces and having second open ends opposite said first open ends, said second open ends being delimited by said filter elements.

15. A filter device according to claim 12 wherein
said filter elements are conical with smaller ends thereof in a direction of said pressure control.

16. A filter device according to claim 12 wherein
flow chambers between said element housings and said filter elements therein expand conically in a direction of said pressure control, free cross sections of said flow chambers at ends thereof adjacent said pressure control are 50 to 120% of inlet surfaces of element caps of said filter elements.

17. A filter device according to claim 16 wherein
said free cross sections of said flow chambers are 100% of the inlet surfaces of said element caps.

18. A filter device according to claim 12 wherein
said filter element in the filtering position has fluid flowing therethrough from an inside thereof to an outside thereof and is connected at said base thereof to a common unfiltrate chamber in said filter housing, said common unfiltrate chamber opening into said filter inlet in fluid communication, said filter elements having closed head ends; and
a flow chamber between said element housing and said filter element in the filtering position opens at an end thereof proximate said pressure control in fluid communication with said common filtrate chamber in said filter housing, said common filtrate chamber being in fluid communication with said filter outlet.

19. A filter device according to claim 12 wherein
said filter element in the backflushing position has a fluid flow therethrough from an outside thereof to an inside thereof, is connected with the respective element housing thereof at a head side thereof to said pressure control in fluid communication and is connected at a base side thereof via a free element end of the respective element housing to a direct release valve in fluid communication.

20. A valve device according to claim 12 wherein
said throttle point directly connects said fluid chamber and said common filtrate chamber without a valve.

21. A valve device according to claim 12 wherein
said throttle point tapers in a direction away from said fluid chamber.

* * * * *